(12) United States Patent
Sampathkumaran et al.

(10) Patent No.: US 9,840,639 B2
(45) Date of Patent: Dec. 12, 2017

(54) HYDROPHILIC ANTI-FOG COATINGS

(71) Applicant: InnoSense, LLC, Torrance, CA (US)

(72) Inventors: Uma Sampathkumaran, Torrance, CA (US); Kevin H. Yu, Temple City, CA (US); Corey M. Selman, West Hills, CA (US)

(73) Assignee: INNOSENSE LLC, Torrance, CA (US)

( * ) Notice: Subject to any disclaimer, the term of this patent is extended or adjusted under 35 U.S.C. 154(b) by 251 days.

(21) Appl. No.: 14/664,049

(22) Filed: Mar. 20, 2015

(65) Prior Publication Data

US 2015/0344725 A1    Dec. 3, 2015

Related U.S. Application Data

(60) Provisional application No. 61/971,399, filed on Mar. 27, 2014.

(51) Int. Cl.
| | |
|---|---|
| *G02B 1/18* | (2015.01) |
| *C09D 175/04* | (2006.01) |
| *C09D 175/00* | (2006.01) |
| *C08G 77/26* | (2006.01) |
| *C08G 77/46* | (2006.01) |
| *G02B 1/04* | (2006.01) |
| *C08K 7/26* | (2006.01) |
| *C08K 3/36* | (2006.01) |
| *B82Y 20/00* | (2011.01) |

(52) U.S. Cl.
CPC ........... *C09D 175/04* (2013.01); *C08G 77/26* (2013.01); *C08G 77/46* (2013.01); *C09D 175/00* (2013.01); *G02B 1/04* (2013.01); *G02B 1/18* (2015.01); *B82Y 20/00* (2013.01); *C08G 2290/00* (2013.01); *C08K 3/36* (2013.01); *C08K 7/26* (2013.01); *C08K 2201/005* (2013.01); *C08K 2201/011* (2013.01)

(58) Field of Classification Search
CPC ........... C09D 175/04; G02B 1/18; C08K 3/34
USPC ........................................................ 523/169
See application file for complete search history.

(56) References Cited

U.S. PATENT DOCUMENTS

| | | |
|---|---|---|
| 3,867,175 A | 2/1975 | Dornte |
| 4,409,285 A | 10/1983 | Swerdlow |
| 4,765,729 A | 8/1988 | Taniguchi |
| 5,073,404 A | 12/1991 | Huang |
| 5,262,233 A | 11/1993 | Sudo et al. |
| 5,262,475 A | 11/1993 | Creasy |
| 5,462,587 A | 10/1995 | Greenleaf et al. |
| 6,013,372 A | 1/2000 | Hayakawa et al. |
| 6,045,903 A | 4/2000 | Seino et al. |
| 6,071,606 A | 6/2000 | Yamazaki et al. |
| 6,156,409 A | 12/2000 | Doushita et al. |
| 6,337,129 B1 | 1/2002 | Watanabe et al. |
| 6,350,397 B1 | 2/2002 | Heikkila et al. |
| 6,387,519 B1 | 5/2002 | Anderson et al. |
| 6,420,020 B1 | 7/2002 | Yamazaki et al. |
| 6,503,631 B1 | 1/2003 | Faverolle et al. |
| 6,506,446 B2 | 1/2003 | Yamamoto et al. |
| 6,587,263 B1 | 7/2003 | Iacovangelo et al. |
| 6,716,513 B1 | 4/2004 | Hasuo et al. |
| 6,783,845 B2 | 8/2004 | Zhang et al. |
| 6,835,322 B2 | 12/2004 | Yoshida et al. |
| 7,294,365 B2 | 11/2007 | Hayakawa et al. |
| 7,361,394 B2 | 4/2008 | Kondo et al. |
| 7,503,964 B2 | 3/2009 | Hasinovic |
| 7,892,606 B2 | 2/2011 | Thies et al. |
| 7,919,145 B2 | 4/2011 | Meredith et al. |
| 7,981,506 B2 | 7/2011 | Naito et al. |
| 7,998,554 B2 | 8/2011 | Wang et al. |
| 8,227,076 B2 | 7/2012 | Angelopoulos |
| 8,227,085 B2 | 7/2012 | Kishikawa et al. |
| 8,281,657 B2 | 10/2012 | Sneek |
| 2001/0036547 A1 | 11/2001 | Yamazaki et al. |
| 2002/0061950 A1 | 5/2002 | Yamamoto et al. |

(Continued)

FOREIGN PATENT DOCUMENTS

| | | |
|---|---|---|
| CA | 2111468 C | 11/1999 |
| CA | 2260778 C | 6/2006 |

(Continued)

OTHER PUBLICATIONS

Shraboni Das et al: "Inorganic: Organic Hybrid Nanoparticles from n-Octyl Triethoxy Silane", Journal of Colloid and Interface Science, Academic Press, New York, NY, US vol. 252, No. 1, Jul. 1, 2002 (Jul. 1, 2002), pp. 82-88, XP008129223, ISSN. 0021-9797, 001. 10.1 006/JCIS.2002.8404.
Shraboni Das et al: "Inorganic-Organic Hybrid Nanoparticles from n-Octyl Triethoxy Silane", Journal of Colloid and Interface Science, Academic Press, New York, NY US, vol. 252, No. 1, Jul. 2002 (Jun. 2002), pp. 82-88, XP008129223, ISSN: 0021-9797, DOI: 10.1006/JCIS.2002.8404.

*Primary Examiner* — Edward Cain
(74) *Attorney, Agent, or Firm* — Koppel, Patrick, Heybl & Philpott

(57) ABSTRACT

The present invention relates to hydrophilic anti-fog coatings. In particular, the coatings use two types of nanoscale particles, colloidal silica and porous organosilicate micelles, in a polyurethane matrix. The invention is an anti-fog coating for optically clear substrates (polycarbonate, polyurethane, nylon, polyester and other clear plastics) without the need for a primer and glass or oxide substrates with an additional primer layer, comprising monosized colloidal silica nanoparticles and porous organosilicate micelles in a polyurethane matrix. The silica is preferably 1-5% by weight and the micelles are loaded at 0.1 to 10% volume percentage by volume. The polyurethane prepolymer is dissolved at 10-40% by weight in a mixture of tertiary amyl alcohol and diacetone alcohol to customize for dip, flow or spray coating processes

4 Claims, 4 Drawing Sheets

(56) References Cited

U.S. PATENT DOCUMENTS

| | | |
|---|---|---|
| 2002/0176983 A1 | 11/2002 | Yamazaki et al. |
| 2003/0207090 A1 | 11/2003 | Arora |
| 2004/0237833 A1 | 12/2004 | Sepeur et al. |
| 2004/0248995 A1 | 12/2004 | Glaubitt et al. |
| 2004/0258929 A1 | 12/2004 | Glaubitt et al. |
| 2005/0137334 A1 | 6/2005 | Mondain-Monval et al. |
| 2005/0233135 A1 | 10/2005 | Iyer et al. |
| 2007/0215004 A1 | 9/2007 | Kuroda et al. |
| 2009/0029145 A1 | 1/2009 | Thies et al. |
| 2009/0053465 A1 | 2/2009 | Scherg et al. |
| 2009/0098409 A1 | 4/2009 | Yamada et al. |
| 2010/0062152 A1 | 3/2010 | Roche et al. |
| 2010/0068486 A1 | 3/2010 | Kayanoki et al. |
| 2010/0092765 A1 | 4/2010 | Hager et al. |
| 2010/0104858 A1 | 4/2010 | Horio et al. |
| 2010/0221513 A1 | 9/2010 | Anderson et al. |
| 2010/0291295 A1 | 11/2010 | Ichiyanagi et al. |
| 2010/0304150 A1 | 12/2010 | Zheng et al. |
| 2011/0033694 A1 | 2/2011 | Jing et al. |
| 2011/0073003 A1 | 3/2011 | Gemici et al. |
| 2011/0183566 A1 | 7/2011 | Feder et al. |
| 2011/0256312 A1 | 10/2011 | Suzuki et al. |
| 2011/0318567 A1 | 12/2011 | Hildenbrand et al. |
| 2012/0019767 A1 | 1/2012 | Cadet et al. |
| 2012/0019915 A1 | 1/2012 | Yan et al. |
| 2012/0027933 A1 | 2/2012 | Zheng et al. |
| 2012/0045954 A1 | 2/2012 | Bleecher et al. |
| 2012/0052289 A1 | 3/2012 | Jing et al. |
| 2012/0177928 A1 | 7/2012 | You et al. |

FOREIGN PATENT DOCUMENTS

| | | |
|---|---|---|
| DE | 69737122 T2 | 4/2007 |
| EP | 0600053 B1 | 8/1997 |
| EP | 0914364 B1 | 12/2006 |
| JP | 2003 073147 A | 3/2003 |
| WO | 9323471 A1 | 11/1993 |
| WO | 9803575 | 1/1998 |
| WO | WO 2004/013063 A1 | 2/2004 |

N-(Acetylglycyl)-3-aminopropyltrimethoxysilane

2-[(Acetoxy(polyethyleneoxy)propyl]triethoxysilane

3-Cyanopropyltrimethoxysilane

|  | Uncoated | Anti-Fog Coated |
|---|---|---|
| Polyurethane | Θ = 65±2° | Θ = 5-10° |
| Polycarbonate | Θ = 83±2° | Θ = 5-8° |

Figure 6

HYDROPHILIC ANTI-FOG COATINGS

This application claims priority based on U.S. Pat. Ser. No. 61/971,399, which is incorporated herein in its entirety.

This invention was made with government support under W911NF-11-C-0056 awarded by U.S. Army RDECOM ACQ CTR. The government has certain rights in the invention.

FIELD

The present invention relates to hydrophilic anti-fog coatings. In particular, the coatings use two types of nanoscale particles, colloidal silica and porous organosilicate micelles, in a polyurethane matrix to enhance the anti-fog durability and chemical resistance of the coatings.

BACKGROUND

A number of different types of hydrophilic anti-fog coatings are known. However, these coatings have issues with effectiveness, durability to solvents and resistance to chemical contaminant exposure. An improved anti-fog coating is needed that has sustained super-hydrophilic properties, is more durable to solvents and has improved resistance to chemical contaminant exposure.

SUMMARY OF THE INVENTION

The present invention relates to hydrophilic anti-fog coatings. In particular, the coatings use two types of nanoscale particles, colloidal silica and porous organosilicate micelles, in a polyurethane matrix to enhance the anti-fog durability and chemical resistance of the coatings. The invention is a transparent anti-fog coating for optically clear substrates (polycarbonate, polyurethane, nylon, polyester and other clear plastics without the need for a primer and glass with a primer) comprising of monosized colloidal silica nanoparticles and porous organosilicate micelles dispersed in a polyurethane matrix. The silica is preferably 1-5% of weight and the micelles are loaded at 0.1 to 10% volume percentage by volume. The residual water content in the nanoparticle additives is less than 1.5% to achieve clear optical coatings. The polyurethane prepolymer may be diluted in a mixture of tertiary amyl alcohol and diacetone alcohol according to standard industry practice at 10% by weight for a highly viscous solution used in dip or flow coating and at 40% by weight for a sprayable low viscosity solution.

BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

FIG. 6 is a table of images showing polyurethane and polycarbonate substrates uncoated and coated with a preferred embodiment of the invention;

DETAILED DESCRIPTION OF PREFERRED EMBODIMENTS

Figure 1:
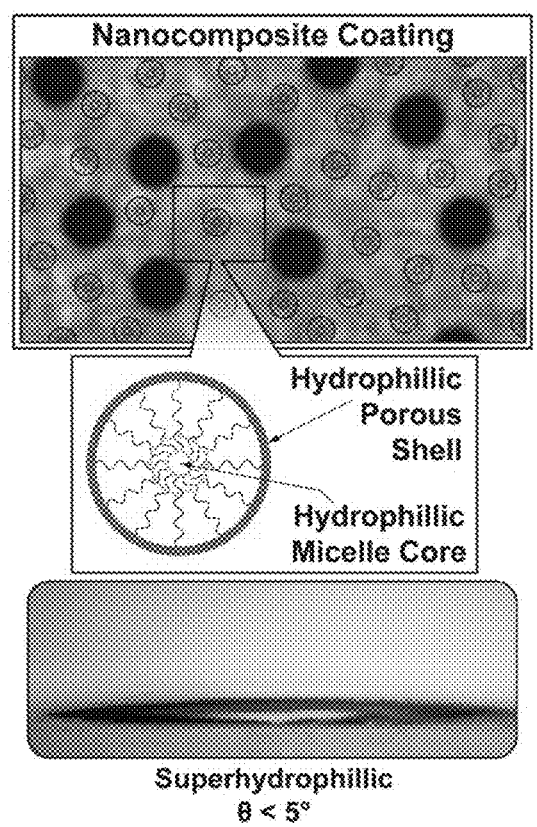
FIG. 1 is a diagram of a preferred embodiment of the invention where the porous organosilicate micelles have a hydrophilic micellar core.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident however, that such embodiment(s) may be practiced without these specific details.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Referring now to FIG. 1, a preferred embodiment of the invention is shown. This preferred embodiment is a superhydrophilic anti-fog coating. In this formulation, there is a combination of two types of nanoscale particles (NPs), colloidal silica (preferably Esol™ brand colloidal silica) and porous organosilicate micelles (preferably PORSILM™ brand porous organosilicate micelles), in a heat curing polyurethane (PU) prepolymer (preferably Visgard® brand polyurethane from Film Specialties, Inc. in Hillsborough, N.J.) as the base matrix. It is contemplated that a UV curing polyurethane prepolymer formulation would be a preferred embodiment to be used on temperature sensitive substrates. Preferably, monosized nanoparticles of colloidal silica have surface chemistry that renders them particularly suitable for stabilization in the polyurethane matrix. Preferably, the porous organosilicate micelles have a porous hydrophilic silicate shell and a hydrophilic or hydrophobic micellar core. The porous shell draws water or moisture away from the coated surface and into the coating by capillary action while the micelle core acts as a reservoir for the water droplets collecting on the film surface as shown in FIG. 1. This ensures the coating retains the desired superhydrophilic, water-sheeting characteristics over time.

Figure 2:
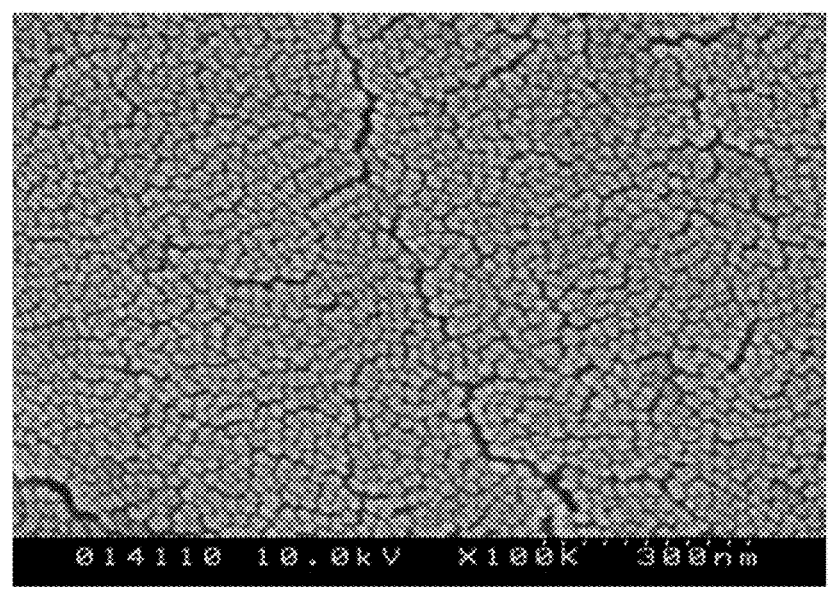
FIG. 2 is an image of monodisperse silica nanoparticles of approximately 30 nm in a preferred embodiment of the invention.

Colloidal Silica NPs, such as Esol™ brand NPs, are preferably made by the modified Stöber process. The Stöber process is described in: W. A. Stöber, A. Fink and E. Bonn, "Controlled growth of monodisperse silica spheres in the micron size range." *J. Colloid. Interface. Sci.*, 26:62-69 (1968) which in incorporated herein by reference. The Stöber process involves the base-catalyzed hydrolysis of tetraethyl orthosilicate to form colloidal silica NPs. By varying temperature, pH, and processing time, silica NP (~10-60 nm) sols have been made with great reproducibility. Referring now to FIG. 2, the scanning electron microscope (SEM) image shows silica NPs with a monodisperse particle size of ~30 nm, which was confirmed by the dynamic light scattering (DLS) technique. The colloidal silica sols are very stable and can be dispersed in PU-based hydrophilic formulations. The PU formulation is intended for use on polycarbonate (PC), PU, nylon, polyester and other clear plastics without the need for primers and glass substrates with the use of a primer. It consists of a heat curing hydrophilic PU prepolymer diluted at 10-40 wt % in a mixture of tertiary amyl alcohol and diacetone alcohol. The resulting heat cured polymer is elastic, non-brittle and fully cross-linked. A solvent exchange step is used to replace ethanol and any residual water in the colloidal silica suspension with diacetone alcohol prior to its addition into the PU prepolymer solution. Lowering the residual water content in the NP additive prevents undesired side reactions between the PU isocyanate groups and water or ethanol that could lead to the formation of gels in the coating formulation. The residual water content in the colloidal silica sol must remain below 1.5% to achieve clear optical coatings. Colloidal silica NP loading can range from 1-5 wt % with a preferred loading of 2-3 wt %.

Figure 3:
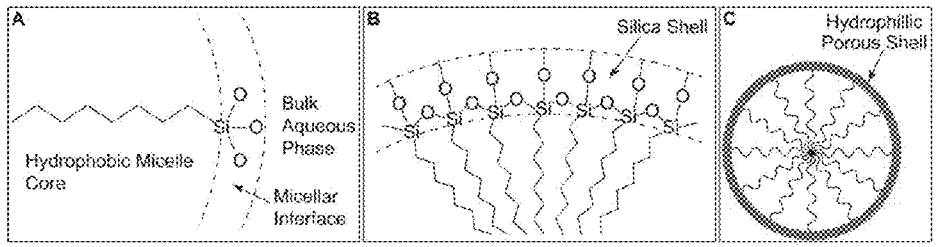
FIG. 3 is a schematic showing the formation of an organosilicate normal nanomicelle with a hydrophilic porous shell (corona) where portion A shows a micellar interface in a bulk aqueous phase, portion B shows a silica shell and portion C shows a hydrophilic porous shell.

The porous organosilicate micelle NPs, preferably POR-SILM™ brand porous organosilicate micelles, can be prepared from a micellar aggregate of octyl triethoxysilane (OTES) in a polar medium such as water. This is called a normal or oil-in-water micelle. A non-ionic surfactant, preferably polyethylene glycol tert-octylphenyl ether (t-octyl-$C_6H_4$—$(OCH_2CH_2)_xOH$ where x=9-10) commonly known as Triton X-100, is used as a host reactor that allows the OTES to form a micellar structure where the octyl chain remains inside the hydrophobic center and the triethoxysilanes exfoliate to the surface. The exfoliated siloxane groups cross-link and form a porous hydrophilic outer shell. Preferably, after stirring for 72 hours, the solution is dialyzed against water preferably for 16-24 hours to remove excess Triton X-100 and harvested as a colloidal suspension that can be re-dispersed in the hydrophilic polyurethane prepolymer matrix. FIG. 3 shows this schematically. Micelles are made that range in size from 7-10 nm in size as measured by DLS. This is one possible configuration for porous organosilicate micelle NPs with a hydrophilic porous silica shell that can draw water or any polar solvent from the coating surface into the micelle core. The porous organosilicate micelle NPs loading can vary from 0.1-10% v/v, with a preferred loading of 5-8% v/v. The porous micelle acts as a reservoir drawing any condensed water from the coated surface to enhance hydrophilicity and fogging resistance.

Figure 4:
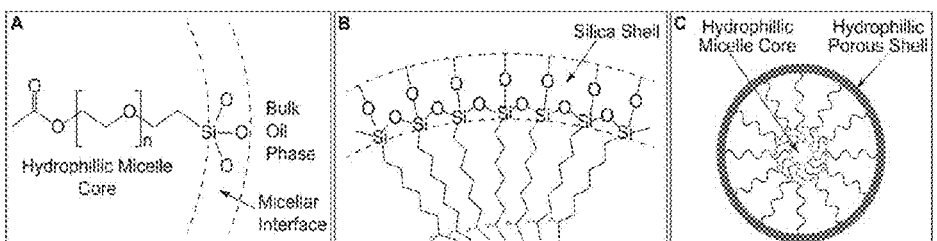
FIG. 4 is a schematic showing the formation of an organosilicate inverse nanomicelle with a hydrophilic porous shell (corona) and a hydrophilic core through the selective and innovative use of precursor materials where portion A shows a micellar interface in a bulk oil phase, portion B shows a silica shell and portion C should a hydrophilic micelle core and a hydrophilic porous shell.
Figure 5:
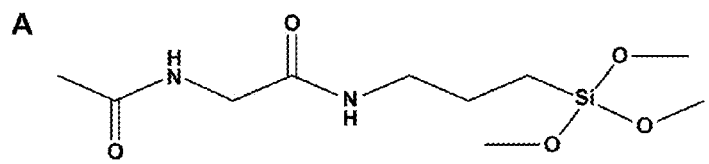
FIG. 5 are chemical diagrams of preferred alkoxy silicate precursors.
Figure 5:
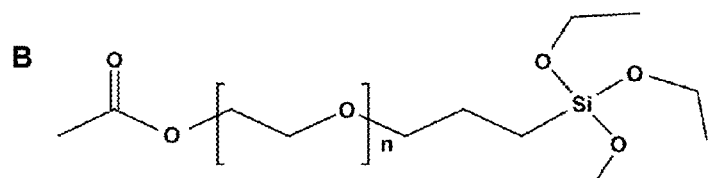
Figure 5:
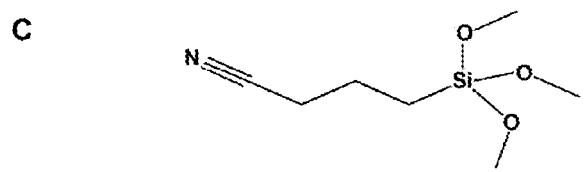

In another preferred embodiment, porous organosilicate micellar NPs are formed using an inverted micelle structure to impart hydrophilicity to the porous shell and retain the micelle core as a reservoir for hydrophilic or polar solvents. Sodium salt of bis(2-ethylhexyl) sulfo-succinate (Aerosol OT or AOT) in n-hexane can be used as a preferred host reactor for the formation of inverse micelles (water-in-oil) shown in FIG. 4. The precursors can be selected from a family of long chain molecules with silicate functionality at one terminus and a second functional group t with greater polarity than the silicate functional group at the other terminus. The preferred choices for alkoxy silicate precursors for use in the inverse micelle are shown in FIG. 5. The porous micelle corona draws water or moisture to the surface while the hydrophilic core acts as a reservoir for the moisture or water from the coated surface to enhance hydrophilicity and fogging resistance.

Referring now to FIG. 6, the image shows the modification of PU and PC substrate surfaces by comparing the water contact angles of uncoated and coated substrates. The water contact angles of 5° clearly demonstrate the superhydrophilic nature of the preferred embodiment of the invention.

EN168/ASTM F659-10 Fog Resistance Test Method

Figure 7A:
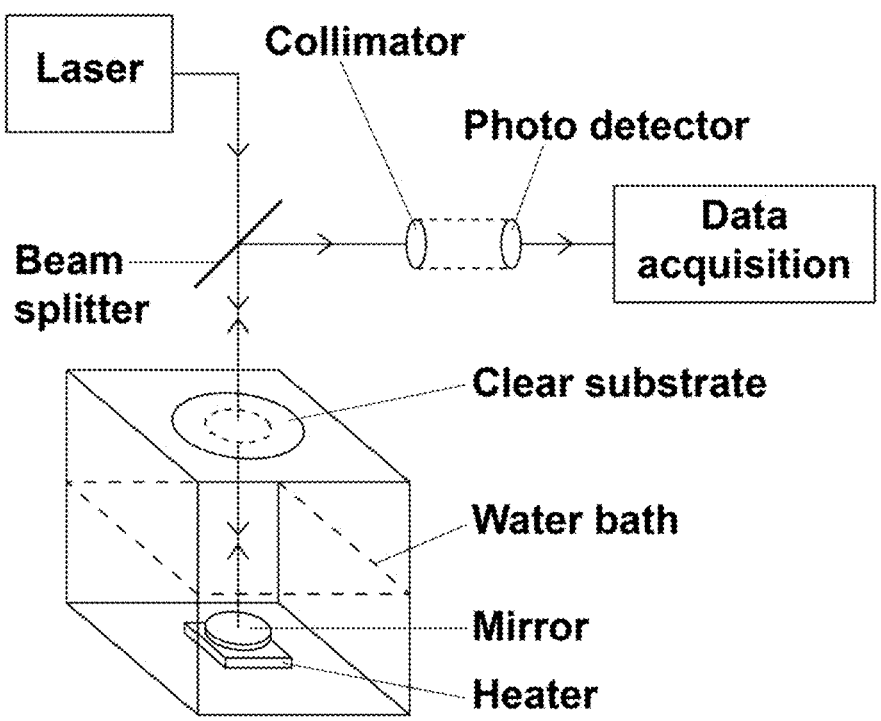
FIG. 7A shows the test setup for measuring fog resistance using the ASTM F659 method; and, FIG. 7B shows a graph of data from a fog resistance test on a coated PC lens. The vertical line represents the 30 second mark after the test lens is positioned in the beam path.

A fog tester was constructed in-house to characterize the fogging resistance of coated samples (for example—concave side of PC lenses or PU visors, or flats) as shown in FIG. 7A. The test follows DIN standard EN168-2001(E) and ASTM F659-10 with minor modifications. As the concave surface of a lens fogs, the light is dispersed and the 1 cm diameter of the light beam is diffused resulting in a larger diameter beam. The photodetector, however, only detects the central 1 cm diameter portion of the diffused beam. The recorded response of the photodetector indicates a reduction in signal intensity, which correlates with the amount of beam diffusion resulting from lens fogging. The response curve is displayed in relative light intensity measured as volts vs. time.

Interpretation of Results

Criterion No. 1: When using the time for the transmittance to decrease to 80% of its value for the dry lens as the criterion for evaluating the performance, the sample may be described as resistant to fogging if that time was greater than or equal to a specified time in seconds. The ASTM standard specifies 30 sec. The sample passes the fog resistance test if this criterion is met.

Criterion No. 2: When using the time for the transmittance of a highly fogged lens to increase to 80% of its value for the dry sample as the criterion for evaluating the performance, the sample may be described as resistant to fogging if that time was less than or equal to the specified time in seconds. The ASTM standard specifies 30 sec. The sample passes the fog resistance test if this criterion is met.

Figure 7B:
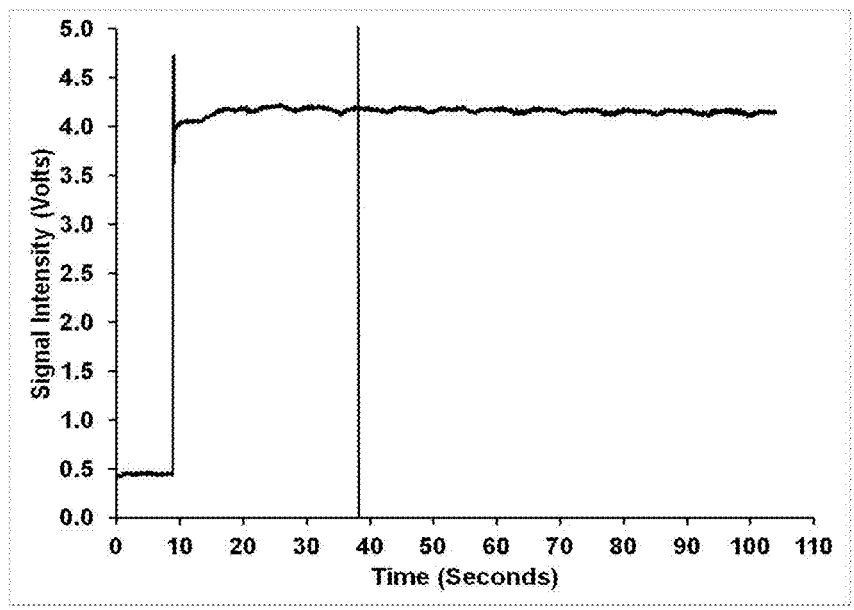

A lens coated with a preferred embodiment of the present invention passes the fog resistance by both the EN 168 (8 s) and ASTM 659 (30 s) test criteria, which are standards used in the industry. FIG. 7B shows a typical anti-fog performance result for the coatings of the present invention passing the test using Criterion 1, i.e., the light transmission never falls below 80% of the baseline through the 30 sec test period. The coatings were tested for anti-fog durability and passed the ASTM test condition for eleven (11) out of twelve (12) cycles of ten (10) microfiber abrasions/cycles.

Test for Durability to Solvent Pooling

For the pooling studies, approximately 10-15 drops of the test solvent were placed on the center of the concave lens and allowed to pool. Solvents were tested in the following order (by rough order of severity): 1) isopropanol, 2) heptane, 3) toluene, 4) acetone, and 5) ethyl acetate. Over a period of 30 minutes, the lens was observed for swelling, blistering, pitting, peeling, delamination, discoloration, etc., at least every 2 minutes. If necessary, additional solvent was added to ensure the solvent remained in contact with the coated surface throughout the entire length of the test. A coated surface that showed no changes after 30 minutes was considered to pass; observation of any change on the surface was considered failing. Table 1 shows the durability of the hydrophilic coatings of the present invention in response to the above-mentioned solvents.

TABLE 1

Solvent Durability of Coatings on PC Lenses

| Sample Type | Coating Thickness ($\mu$) | Solvent | | | | |
|---|---|---|---|---|---|---|
| | | Iso-propanol | Hex-ane | Toluene | Acetone | Ethyl Acetate |
| Uncoated PC lens blank | NA | Pass | Pass | Pass | Pass | Pass |
| Coating on PC Lens | 5.0 | Pass | Pass | Pass | Pass | Pass |

The results in Table 1 clearly show that a preferred embodiment of the present invention coatings have good chemical resistance.

Chemical contaminant resistance testing was performed on the present invention coatings to determine their durability. PC substrates were coated with the hydrophilic formulations to evaluate their resistance to chemical contaminant exposure. For the chemical contaminant resistance requirements, a small drop of liquid (ranging from 0.01 to 0.10 mL) was applied to the coated surface. After an hour, the liquid was carefully wiped away, and the sample was visually observed for any damages or changes in appearance. The list of contaminants tested include salt water, gasoline, diesel fuel, JP-8, Break-Free® CLP®, soapy water, sanitizing solution (hypochlorite bleach solution $Ca(OCl)_2$), aqueous film forming foam (AFFF), aqueous potassium carbonate ($K_2CO_3$), Purple-K (78-82% potassium bicarbonate ($KHCO_3$) and 12-15% sodium bicarbonate, $NaHCO_3$), and insect repellant (98% N,N-Diethyl-meta-toluamide, DEET).

Table 2 displays the results of each contaminant applied to the coating on PC and PU substrates.

TABLE 2

Chemical Contaminant Resistance Tests for Present Invention

| Contaminant | Coating on PC and PU |
|---|---|
| Salt Water | Pass |
| Gasoline | Pass |
| Diesel | Pass |
| JP-8 | Pass |
| Break-Free ® CLP ® | Pass |
| Soapy Water | Pass |
| Sanitizing Solution | Pass |
| AFFF | Pass |
| $K_2CO_3$ | Pass |
| Purple-K | Pass |
| DEET | Fail |

The coating in the present invention survived exposure to ten out of eleven chemicals, the exception being DEET.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether flow control or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A chemical resistant, transparent anti-fog coating for optically clear surfaces comprising colloidal silica and porous organosilicate micelles in a polyurethane matrix,
   a. colloidal silica having monosized nanoparticles with a particle size of 25 to 35 nanometers, the colloidal silica nanoparticles comprising 1-5% by weight of the coating;
   b. porous organosilicate micelles being 5-10 nanometers in size and comprising 0.1 to 10% by volume of the coating, each micelle having a porous hydrophilic silicate shell and a hydrophilic micellar core or
   a porous hydrophilic silicate shell and a hydrophobic micellar core.

2. The coating of claim 1 where the organosilicate micelles result from precursors selected from the following group: N-(Acetylglycyl)-3-aminopropyltrimethoxysilane; 2-[(Acetoxy(polyethyleneoxy)propyl]triethoxysilane; and 3-cyanopropyltrimethoxysilane.

3. An anti-fog coating with sustained water-sheeting and durability properties for plastic substrates comprising monosized colloidal silica nanoparticles and porous organosilicate micelles in a polyurethane matrix wherein,
   the monosized colloidal silica nanoparticles are 25-35 nm in the coating, absorb water droplets or moisture and create a sheeting action at the coating surface to prevent fogging and are from 1-5% by weight; and,
   the porous organosilicate micelles are loaded at 0.1 to 10% volume percentage by volume, are 5-10 nm in the coating and draw water or moisture to the porous micellar surface, said micelles comprising a hydrophilic core that serves as a reservoir to sustain superhydrophilic properties and fogging resistance of a coated surface.

4. The anti-fog coating of claim 3 where the polyurethane matrix is formed from a prepolymer dissolved at a concentration of 10-40% by weight in a mixture of tertiary amyl alcohol and diacetone alcohol, said mixture formulated to have a viscosity suitable for either dip, flow or spray coating of the plastic optical surface.

\* \* \* \* \*